US010710307B2

(12) United States Patent
Ishikawa et al.

(10) Patent No.: US 10,710,307 B2
(45) Date of Patent: Jul. 14, 2020

(54) TEMPERATURE CONTROL FOR ADDITIVE MANUFACTURING

(71) Applicants: David Masayuki Ishikawa, Mountain View, CA (US); Todd J. Egan, Fremont, CA (US); Paul J. Steffas, Santa Clara, CA (US)

(72) Inventors: David Masayuki Ishikawa, Mountain View, CA (US); Todd J. Egan, Fremont, CA (US); Paul J. Steffas, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 326 days.

(21) Appl. No.: 15/675,457

(22) Filed: Aug. 11, 2017

(65) Prior Publication Data
US 2019/0047226 A1 Feb. 14, 2019

(51) Int. Cl.
| | |
|---|---|
| *B29C 64/393* | (2017.01) |
| *B33Y 10/00* | (2015.01) |
| *B33Y 30/00* | (2015.01) |
| *B33Y 50/02* | (2015.01) |
| *B29C 64/153* | (2017.01) |
| *B29C 64/209* | (2017.01) |
| *B29C 64/295* | (2017.01) |

(52) U.S. Cl.
CPC .......... *B29C 64/393* (2017.08); *B29C 64/153* (2017.08); *B29C 64/209* (2017.08); *B33Y 10/00* (2014.12); *B33Y 30/00* (2014.12); *B33Y 50/02* (2014.12); *B29C 64/295* (2017.08)

(58) Field of Classification Search
CPC ..... B29C 64/393; B29C 64/153; B33Y 50/02; B33Y 30/00; B33Y 10/00

USPC ........................... 219/121.63, 121.66, 121.8
See application file for complete search history.

(56) References Cited

U.S. PATENT DOCUMENTS 6,815,636 B2 11/2004 Chung et al.
6,822,194 B2 11/2004 Low et al.
(Continued)

FOREIGN PATENT DOCUMENTS

| JP | 04727722 | 7/2011 |
|---|---|---|
| WO | WO 2016/198885 | 12/2016 |
| WO | WO 2017/071760 | 5/2017 |

OTHER PUBLICATIONS

International Search Report and Written Opinion in International Application No. PCT/US2018/045788, dated Jan. 4, 2019, 13 pages.

*Primary Examiner* — Thien S Tran
(74) *Attorney, Agent, or Firm* — Fish & Richardson P.C.

(57) ABSTRACT

An additive manufacturing apparatus includes a platform, a dispenser to dispense successive layers of feed material on the platform, a heat source above the platform, an energy source to emit a beam of energy to impinge a second region of the topmost layer, a sensor system to measure temperatures of the topmost layer of feed material and to measure a dimension of a melt pool in the second region, and a controller. The heat source is configured to deliver energy to a first region of a topmost layer of the successive layers of feed material to pre-heat and/or heat-treat the first region. The controller is configured to operate the heat source to heat the topmost layer of feed material based on the measured temperatures, and operate the energy source to fuse feed material in the topmost layer based on the measured dimension.

22 Claims, 6 Drawing Sheets

(56) References Cited

U.S. PATENT DOCUMENTS

| | | |
|---|---|---|
| 6,925,346 B1 | 8/2005 | Mazumder et al. |
| 6,930,278 B1 | 8/2005 | Chung et al. |
| 7,020,539 B1 | 3/2006 | Kovacevic et al. |
| 7,419,632 B2 | 9/2008 | Keller |
| 7,515,986 B2 | 4/2009 | Huskamp |
| 7,635,825 B2 | 12/2009 | Larsson |
| 7,713,454 B2 | 5/2010 | Larsson |
| 7,718,933 B2 | 5/2010 | Huskamp |
| 7,820,241 B2 | 10/2010 | Perret et al. |
| 7,850,885 B2 | 12/2010 | Philippi et al. |
| 8,414,281 B2 | 4/2013 | Schleiss et al. |
| 8,784,721 B2 | 7/2014 | Philippi et al. |
| 9,073,265 B2 | 7/2015 | Snis |
| 9,310,188 B2 | 4/2016 | Snis |
| 9,327,450 B2 | 5/2016 | Hein et al. |
| 9,399,321 B2 | 7/2016 | Ljungblad |
| 9,522,426 B2 | 12/2016 | Das et al. |
| 9,662,840 B1 | 5/2017 | Buller et al. |
| 9,676,145 B2 | 6/2017 | Buller et al. |
| 2004/0251242 A1* | 12/2004 | Suh .................. B23K 26/032 219/121.63 |
| 2009/0206065 A1* | 8/2009 | Kruth .................. B22F 3/1055 219/121.66 |
| 2014/0271328 A1* | 9/2014 | Burris ................ B23K 26/034 419/53 |
| 2015/0268099 A1 | 9/2015 | Craig et al. |
| 2016/0114431 A1* | 4/2016 | Cheverton .......... B23K 26/342 219/76.1 |
| 2016/0185048 A1* | 6/2016 | Dave .................... B33Y 50/02 700/119 |
| 2017/0021418 A1 | 1/2017 | Ng et al. |
| 2017/0056974 A1* | 3/2017 | Miyashita ............ B33Y 10/00 |
| 2017/0090462 A1* | 3/2017 | Dave .................... G01N 21/00 |
| 2019/0047226 A1 | 2/2019 | Ishikawa |

* cited by examiner

TEMPERATURE CONTROL FOR ADDITIVE MANUFACTURING

TECHNICAL FIELD

This specification relates to temperature control for additive manufacturing apparatuses and processes.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

In one aspect, an additive manufacturing apparatus includes a platform, a dispenser to dispense successive layers of feed material on the platform, and a heat source above the platform. The heat source is configured to deliver energy to a first region of a topmost layer of the successive layers of feed material to pre-heat and/or heat-treat the first region. The additive manufacturing apparatus further includes an energy source to emit a beam of energy to impinge a second region of the topmost layer to generate a melt pool from feed material in the second region, a sensor system to measure temperatures of the topmost layer of feed material and to measure a dimension of the melt pool, and a controller. The second region is smaller than the first region. The controller is configured to operate the heat source to heat the topmost layer of feed material based on the measured temperatures, and operate the energy source to fuse feed material in the topmost layer based on the measured dimension.

In another aspect, an additive manufacturing method includes dispensing successive layers of feed material on a platform, measuring temperatures of a topmost layer of feed material of the successive layers of feed material, delivering heat to a first region covering the topmost layer based on the measured temperatures, and emitting a beam of energy to a second region smaller than the first region based on a dimension of a melt pool of the feed material created by the beam of energy.

In another aspect, an additive manufacturing apparatus includes a platform, a dispenser to dispense successive layers of feed material on the platform, and a heat source above the platform. The heat source is configured to deliver energy to a first region of a topmost layer of the successive layers of feed material to pre-heat and/or heat treat the first region. The additive manufacturing apparatus further includes an energy source to emit a beam of energy to impinge a second region of the topmost layer to generate a melt pool from feed material in the second region, the second region smaller than the first region, a sensor system, and a controller. The sensor system includes a first camera having a stationary first field of view of a build region of the platform, a second camera having a second field of view that is smaller than the first field of view and that is configured to trail the second region, and a third camera having a third field of view that is smaller than the second field of view and that covers the second region. The controller is configured to receive data from the first camera, the second camera and the third camera and generate a temperature map of the layer of feed material from the data, and operate the energy source to fuse feed material in the topmost layer based on the temperature map.

In some implementations, the heat source includes an array of lamps to deliver energy to the first region. The controller can be configured to selectively operate each lamp of the array of lamps based on the measured temperatures. In some implementations, delivering the heat to the first region includes selectively operating each lamp of an array of infrared lamps based on the measured temperatures.

In some implementations, the energy source comprises a laser. In some implementations, the beam of energy is emitted by the laser.

In some implementations, one or more parameters including a size of the second region, a power of the beam of energy, or a scan speed are adjusted or selected based on the measured dimension. The controller can be configured to operate the energy source to adjust or select the one or more characteristics.

In some implementations, the sensor system comprises an infrared image capture system configured to measure the temperatures across an entire width and an entire length of the topmost layer of feed material.

In some implementations, temperatures are measured at multiple locations uniformly distributed through an entire length and an entire width of the topmost layer of feed material based on thermal emissions from the topmost layer of feed material. The sensor system can include an infrared image capture system configured to measure the temperature. Measuring the temperature of the topmost layer of feed material includes measuring the temperatures at the multiple locations.

In some implementations, the method further includes measuring, using a high-speed camera, the dimension of the melt pool. In some implementations, the apparatus can include a high-speed camera configured to measure the dimension of the melt pool and thermal gradients at solid-liquid interfaces.

In some implementations, the high-speed camera is configured to measure temperatures of feed material in the melt pool. The controller can be configured to determine the dimension of the melt pool based on the measured temperatures of feed material relative to a threshold temperature. Measuring the dimension of the melt pool can include measuring temperatures of feed material in the melt pool, and determining the dimension of the melt pool based on the measured temperatures of feed material relative to a threshold temperature.

In some implementations, the dimension is a length. The high-speed camera can be configured to measure the length and to measure a width of the melt pool. The controller can be configured to operate the energy source based on the measured length and the measured width. The method can further include measuring, using the high-speed camera, the width. Emitting the beam of energy can include emitting the beam of energy based on the measured length and the measured width.

In some implementations, wavelengths are emitted by feed material in a third region of the topmost layer. The sensor system can include a spectrophotometer to detect the wavelengths, cooling rates of feed material in the third region can be determined based on the detected wavelengths and operate the heat source or the energy source based on the determined cooling rates. The controller can be configured to determine the cooling rates. Measuring the temperature can include detecting the wavelengths, and determining the cooling rates.

In some implementations, the third region is smaller than the first region and larger than the second region.

Advantages may include, but are not limited to, those described below and herein elsewhere. A temperature profile, i.e., the temperature as a function of time at a particular position, such as a voxel, of the topmost layer of feed material can be controlled more precisely and accurately. This enables the feed material in the topmost layer to be heated and cooled in a more repeatable manner and according to a desired temperature profile so that the object to be formed by the additive manufacturing apparatus has desired material properties and fewer defects. The sensor system can include multiple distinct sensors, each of which measures properties of the feed material at different regions of the topmost layer. Data from these sensors are combined to provide closed loop feedback control of an energy delivery system of the additive manufacturing apparatus so that the energy delivery system can be operated to precisely and accurately control the temperature profile.

The details of one or more implementations of the subject matter described in this specification are set forth in the accompanying drawings and the description below. Other potential features, aspects, and advantages will become apparent from the description, the drawings, and the claims.

DETAILED DESCRIPTION

Additive manufacturing processes that involve fusing feed material, e.g., a powder, require precise thermal control to meet part quality and yield requirements. For example, during an additive manufacturing process, overheating by an energy delivery system in narrow sections of the pattern can introduce pores in layers of feed material due to keyholes. Porosity adversely affects part material properties such as strength and fatigue resistance and is one of several defects due to thermal problems that affect part quality. Warping, stress-induced cracking and deformation of the part can occur if there is a steep thermal gradient over the topmost layer. Part deformation during an additive manufacturing process is undesirable because deformed parts may physically interfere with moving hardware in an additive manufacturing apparatus or may necessitate part rejection due to nonconformance to part dimensional specifications. Incomplete fusing can occur if too little heat is applied or if too much heat is lost due to uncompensated heat transfer during manufacturing. Thus, it is desirable for portions of the feed material that are to be fused during the manufacturing process to follow a repeatable and desired temperature profile.

Pre-heating a platform that supports the powder can control the temperature profile of uppermost layers of feed material for short parts, but fails to alleviate and can even exasperate temperature control for tall parts. Heat conducted from the platform to the part will not reach the top layers of tall parts because the distance from the pre-heated platform to a topmost layer of feed material is too great. Increasing the amount of heat from the platform to heat the topmost layers of tall parts causes bottom layers of feed material to be over-heated.

A powder can be pre-heated prior to fusing to reduce the temperature difference between the feed material initial temperature and melting temperature and thereby improve fusing quality and throughput. Heat can also be applied to areas after they have been fused (also referred to as "heat-treating") to modify the microstructure of the fused areas and to minimize temperature variation over the layer being produced and thus reduce residual stresses and further improve fusing quality, e.g., by reducing the likelihood of warping, cracking and other problems due to thermally induced residual stress and deformation. The heat can also be used to compensate for thermal non-uniformity due to radiative, convective, and conductive losses. By directing data from multiple sensors that monitor the layer to a closed loop feedback system, an energy delivery system can be operated to more precisely and accurately control the temperature profile.

Figure 1A:
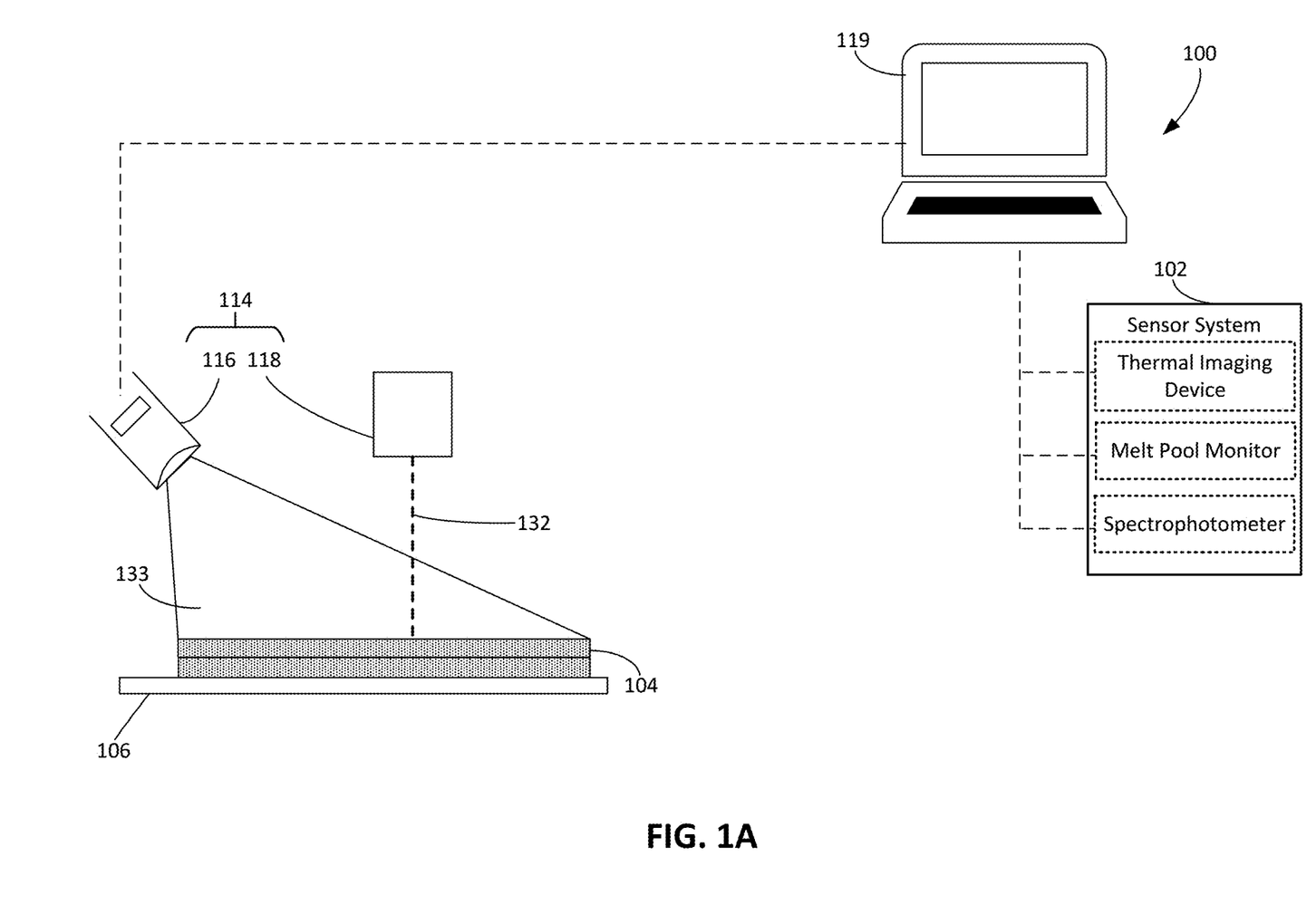
FIG. 1A is a simplified schematic side view of an additive manufacturing apparatus.

Referring to FIG. 1A, an additive manufacturing apparatus 100 includes a sensor system 102 for measuring properties of feed material in a topmost layer 104 of feed material dispensed on a platform 106. The sensor system 102 includes a thermal imaging device 108, a melt pool monitor 110, a spectrophotometer 112, or any combination thereof.

The additive manufacturing apparatus 100 further includes an energy delivery system 114 to selectively deliver energy to the topmost layer 104 of feed material. The energy delivery system 114 includes a heat source 116 and an energy source 118, the heat source 116 being configured to deliver energy to a region larger than a region to which the energy source 118 delivers energy. As described herein, a controller 119 is operably connected to the sensor system 102 and the energy delivery system 114. The controller 119 operates the energy delivery system 114 based on measurements of properties of the feed material in the topmost layer 104 to improve the fusing quality, yield and throughput of the apparatus 100. For example, the sensor system 102 provides measurements of temperature of the topmost layer 104 at a variety of different levels of resolution, and these measurements allow the controller 119 to perform closed-loop feedback control of the energy delivery system 114 to achieve a desired temperature profile in the topmost layer 104 of feed material.

Figure 1B:
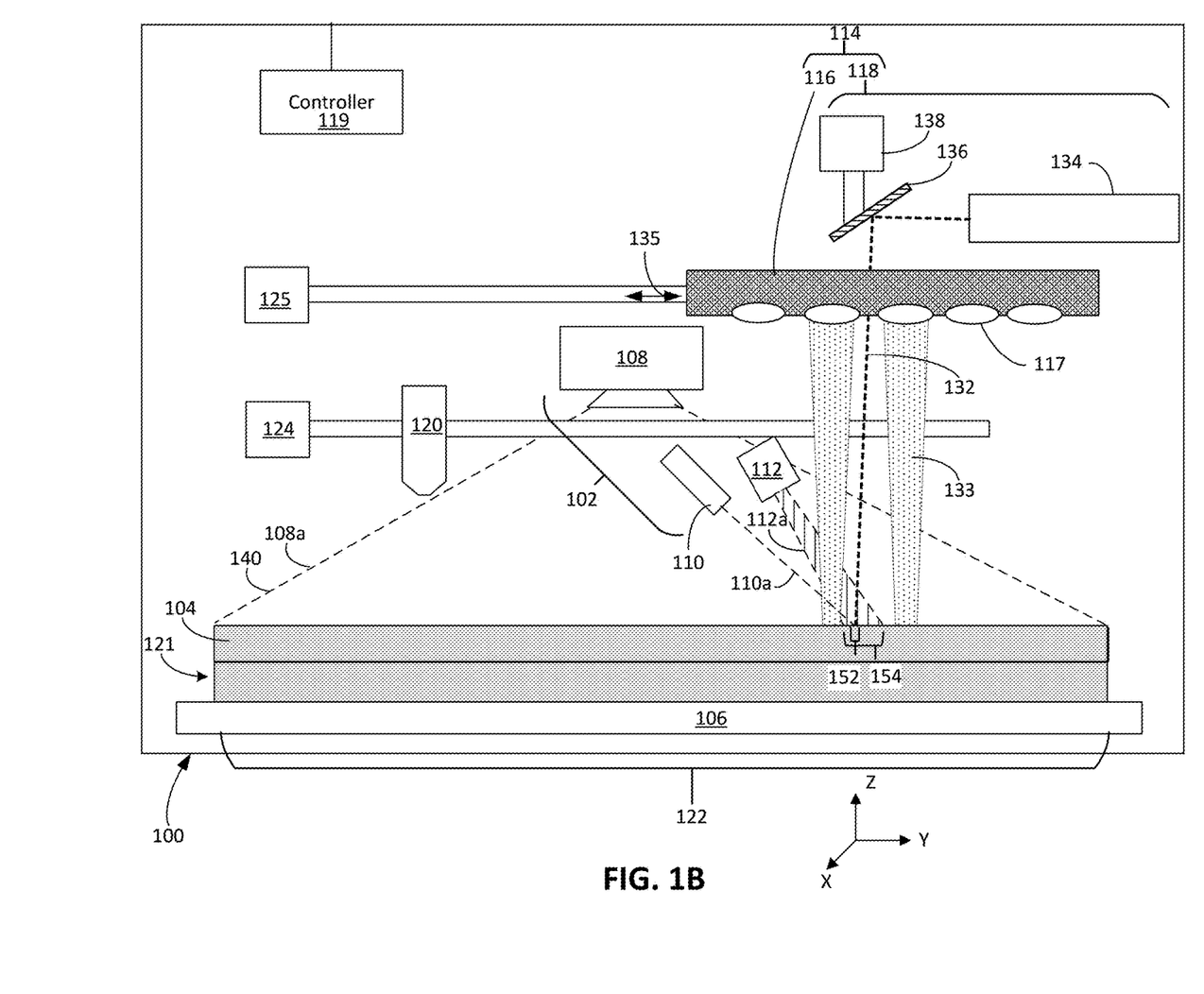
FIG. 1B is a schematic side view of an additive manufacturing apparatus.

In the example depicted in FIG. 1B, the apparatus 100 includes a dispenser 120 to dispense successive layers 121 of feed material onto the platform 106. During an additive manufacturing process, the dispenser 120 dispenses a layer of feed material, and the energy delivery system 114 provides energy in a controlled manner to melt and fuse the feed material to form portions of a desired object.

The dispenser 120 can include one or more nozzles positioned above the platform 106 through which the feed material flows. The feed material is gravity-driven or is actively ejected by the dispenser 120, for example, by a piezoelectric actuator. Control of dispensing of individual nozzles can be provided by pneumatic valves, microelectromechanical systems (MEMS) valves, solenoid valves, and/or magnetic valves. In some implementations, the dispenser 120 includes a roller having apertures through which the feed material is dispensed, a flat blade or paddle to push the feed material from a feed material reservoir across the platform 106, or a tube that has aperture and that encloses an augur to push feed material through the tube.

The apparatus 100 can include a compaction and/or levelling mechanism, e.g., a roller or a blade, to compact and/or smooth the layer of feed materials deposited over the platform 106.

In some implementations, the feed material includes metallic particles. Examples of metallic particles include metals, alloys and intermetallic alloys. Examples of materials for the metallic particles include aluminum, titanium, stainless steel, nickel, cobalt, chromium, vanadium, and various alloys or intermetallic alloys of these metals.

In some implementations, the feed material includes ceramic particles. Examples of ceramic materials include metal oxide, such as ceria, alumina, silica, aluminum nitride, silicon nitride, silicon carbide, or a combination of these materials, such as an aluminum alloy powder.

In some implementations, the feed material includes dry powders or powders in liquid suspension, or a slurry suspension of a material. For example, for a dispenser that uses a piezoelectric printhead, the feed material can include particles in a liquid suspension. The dispenser 120 delivers the powder in a carrier fluid, e.g. a high vapor pressure carrier, e.g., Isopropyl Alcohol (IPA), ethanol, or N-Methyl-2-pyrrolidone (NMP), to form the layers of feed material. The carrier fluid can evaporate prior to the sintering step for the layer. Alternatively, a dry dispensing mechanism, e.g., an array of nozzles assisted by ultrasonic agitation and pressurized inert gas, can be employed to dispense the feed material.

The platform 106 and the dispenser 120 are movable relative to one another to allow the dispenser 120 to dispense the feed material at different portions of the platform 106. In particular, this movement enables the feed material to be dispensed across different portions along a build area 122 of the platform 106. For example, an actuator system 124 including one or more actuators is operable to drive the dispenser 120 relative to the platform 106 along a first axis, e.g., the X-axis, and a second axis, e.g., the Y-axis.

The energy delivery system 114 is configured to deliver energy to the topmost layer 104 of feed material on the platform 106 to pre-heat, heat-treat, or melt a portion of the topmost layer 104 of feed material. In particular, the controller 119 operates the energy delivery system 114 in accordance to digital data representing a predefined pattern to selectively fuse portions of the feed material and thereby form an object. As described herein, the controller 119 can store data that represents a desired temperature profile. This data can be generated based on measurement by the sensor system 102. The controller 119 is also operable to vary an amount of energy delivered to the feed material to achieve the desired temperature profile and thus the selective fusing of the feed material.

Figure 2:
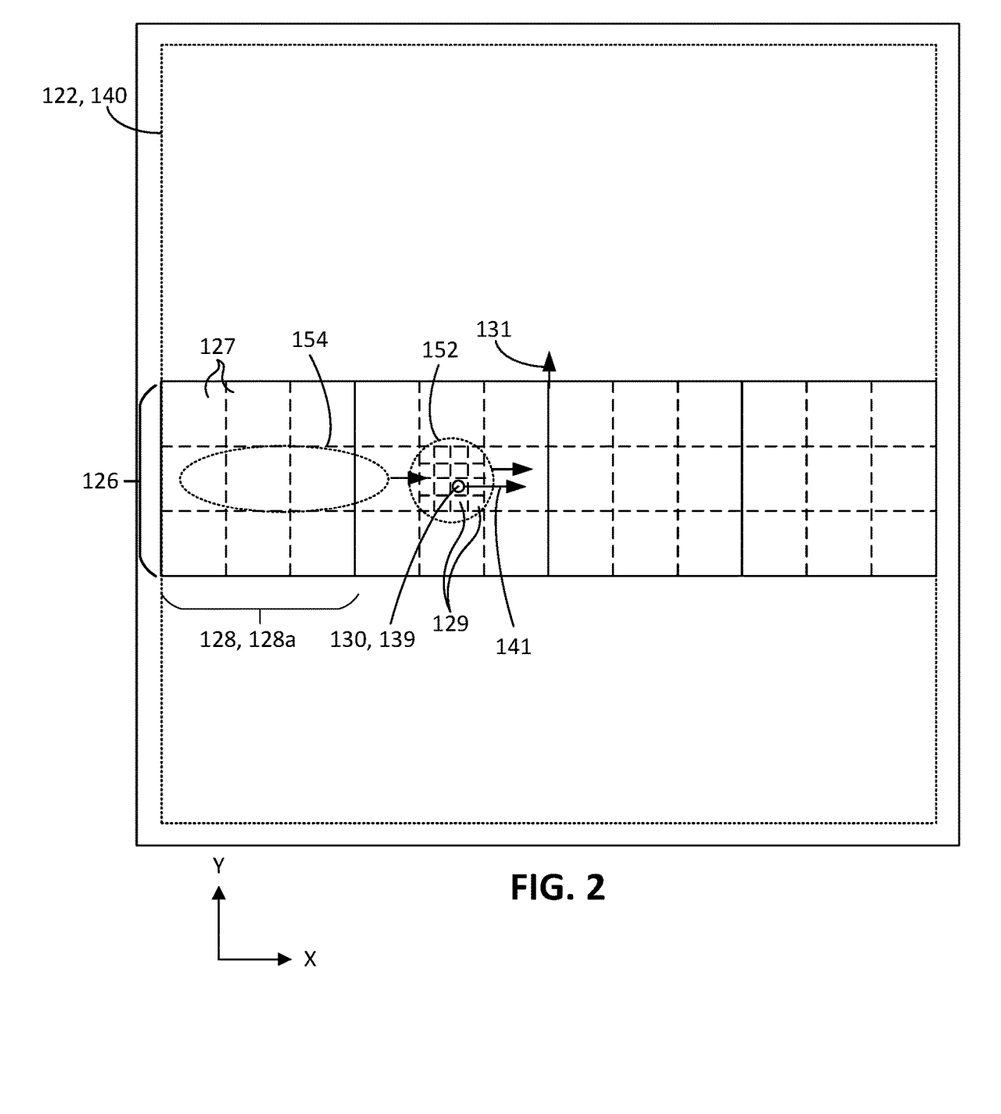
FIG. 2 is a top view of a layer of feed material.

Referring to FIG. 2, the energy delivery system 114 and the sensor system 102 deliver energy to and take measurements of different sized portions of the topmost layer 104 of feed material in the build area 122. For example, the build area 122 can include voxels 129, cells 127, and sections 128, where the voxels 129 are the smallest sized portion. The cells 127 are larger than the voxels, and the sections 128 are larger than the cells but smaller than the build area 122. The voxels 129 can be the smallest sized portion of the topmost layer 104 to which energy is selectively delivered by the energy delivery system 114 or the smallest sized portion monitored by the sensor system 102. Each of the cells 127 includes multiple voxels 129, multiple cells 127 form a section 128, and multiple sections 128 form the build area 122. As described herein, the subsystems of the energy delivery system 114 and the subsystems of the sensor system 102 can have different sized regions of coverage, e.g., regions 126, 140, 152, 154.

The heat source 116 of the energy delivery system 114 is configured to deliver energy to a region 126 of the topmost layer 104. In some implementations, the region 126 extends across an entire width of the build area 122 of the platform 106, across an entire length of the build area 122, or both. Alternatively or additionally, the region 126 extends across a portion of the width of the build area, a portion of the length of the build area, or both.

In implementations in which the heat source 116 is operable to deliver energy only to a portion of the width or the length of the build area 122, the platform 106 and the heat source 116 are movable relative to one another, e.g., to cause relative motion 135 (shown in FIG. 1B) between the platform 106 and the heat source 116, to cause relative motion in a direction 131 (shown in FIG. 2). For example, an actuator system 125 (shown in FIG. 2) includes one or more actuators operable to drive the heat source 116 relative to the platform 106 along the first axis and/or the second axis. In this regard, the heat source 116 is movable horizontally across the platform 106 such that energy is deliverable across the entire build area 122. In the example depicted in FIG. 2, the heat source 116 is movable in the direction 131 parallel to the Y-axis.

The heat source 116 is operable to selectively deliver energy to one or more of sections 128 of the region 126. Each section 128 can include multiple cells 127 of feed material, each cell 127 corresponding to a region containing multiple voxels 129 of feed material. Although the section 128 is illustrated as a square region occupying multiple voxels along both the X-axis and Y-axis, this is schematic, and the region can have other shapes, and for some implementations could be only a single voxel wide in the X-axis or Y-axis.

For example, the heat source 116 can include multiple infrared lamps 117 selectively activatable to illuminate the sections 128. Each of the infrared lamps 117, when activated, emits infrared light 133 that heats a corresponding one of the sections 128 on the topmost layer 104. The infrared lamps 117 are electronically addressable so that an amount of energy delivered to each section 128 is independently controllable. For example, for each of the lamps, a power supplied to the infrared lamp can be modulated. In some implementations, the infrared lamps 117 of the heat source 116 are arranged in a linear array extending along the X-axis, the Y-axis, or both.

In some implementations, the infrared lamps 117 extend across the entire width of the platform 106 such that the infrared lamps 117 can be independently controllable to deliver energy to the sections 128 of the entire region 126.

In such cases, the infrared lamps 117 do not move along the X-axis to deliver energy to the region 126. Alternatively, the infrared lamps 117 only extend across a portion of the width of the platform 106 and are independently controllable to deliver energy to only a portion of the sections 128 of the entire region 126. The heat source 116 including the infrared lamps 117 can be movable relative to the platform 106 along the X-axis to allow the infrared lamps 117 to heat the entire region 126.

Above some temperatures, a powder may become tacky and thus viscous. This can interfere with proper depositing of the layer or subsequent layers. Thus, for some additive manufacturing processes, it is desirable to raise the temperature of the powder, but not above a threshold temperature at which the powder becomes tacky or viscous. In the context of metal powders, "tacky" can indicate a small amount of necking or sintering, e.g., some percentage of particles become sintered at points of contact but without significant morphology change in the particles. Assuming the heat source 116 is for pre-heating, the heat source 116 provides energy to the region 126 to heat a selected portion of the voxels to a first temperature below a second temperature at which the feed material fuses. This first temperature can be above a third temperature at which the feed material undergoes necking. The first temperature can be above a fourth temperature at which the feed material undergoes caking. This higher fourth "caking" temperature is above the threshold at which the feed material undergoes sintering at points of contact but remains substantially porous and does not experience significant densification, e.g., achieves a cake-like consistency. In some implementations, this higher fourth temperature is above the caking temperature but still below a fusing temperature at which feed material fuses, e.g., sinter or melts to form a solid mass with lower porosity or reduced gaps between particles.

In addition to delivering energy through the heat source 116, the energy delivery system 114 delivers energy using the energy source 118, which delivers energy to a region 130 of the topmost layer 104. The region 130 is smaller than the region 126 to which the heat source 116 delivers energy. For example, the region 130 can have a spot size no larger than a single voxel or could have a spot size covering multiple voxels. The region 130, in this regard, is smaller than the size of the cells 127. Although FIG. 2 illustrates the region 130 to be within the region 126, the region 126 could be heated before the energy delivery system 114 heats the region 130. For example, as shown in FIG. 1B, the infrared light 133 could heat a section 128a (shown in FIG. 2), while the beam spot 139 heats the region 130 (shown in FIG. 2). Relative motion 135 between the infrared lamps 117 and the platform 106 enables the section 128a to which the infrared light 133 is delivered to be scanned across the region 126, tracking the region 130.

Returning to FIG. 1B, the energy source 118 includes an optical engine that emits a beam of energy 132 to impinge the region 130 of the topmost layer 104. The beam of energy 132 selectively delivers sufficient heat to fuse the feed material in the predefined pattern corresponding to the object to be formed. In some implementations, fusing includes melting and solidification, or sintering while still in solid form, or other processes of fusing a powder.

In some implementations, the optical engine includes a laser 134 and a mirror 136. The laser 134 emits the beam of energy 132 toward the mirror 136, and the mirror 136 redirects the beam of energy 132 toward different portions of the topmost layer 104. For example, the mirror 136 is rotatable to redirect the beam of energy 132 to different portions of the topmost layer 104 along the Y-axis. For example, the mirror 136 can be part of a polygon mirror scanner or a galvo mirror scanner.

The entire energy source 118 can be translatable to allow the mirror 136 to redirect the beam of energy 132 to portions of the topmost layer 104 along the X-axis, or movement of the energy beam 132 along the X-axis could be provided by a second galvo mirror scanner. In some implementations, an actuator system 138 includes a first actuators to translate the mirror 136, and a second actuator to rotate the mirror 136. This enables a beam spot 139 (see FIG. 2), e.g., delivered to the region 130, to be moved horizontally across the build area 122 along both the X-axis and Y-axis. The beam spot 139 moves in a direction 141 parallel to the X-axis when the mirror 136 is rotated. The beam spot 139 is swept, in a scanning pattern, along parallel paths extending along the X-axis and spaced relative to one another along the Y-axis. To enable selective fusing of feed material across the entire build area 122, after fusing feed material along a particular path, the energy source 118 is movable along the Y-axis in increments corresponding to the hatch spacing of the scanning pattern such that that the beam spot 139 can sweep along another parallel path offset from the initial fused path.

In some implementations, the energy source 118 and the heat source 116 are mounted to the same support above the platform 106, and a common actuator drives the energy source 118 and the heat source 116 to move along the support relative to the platform 106. This actuator, when driven, moves the heat source 116 and the energy source 118 along the Y-axis.

The sections 128 of the region 126 can be about two to ten times, or more, larger than a voxel. The voxels 129 can be about 50 to 150 times, or more, larger than the spot size of the region 130. Sections 128 are orders of magnitude larger than the region 130. For example, each of the different sections 128 can be approximately 10 mm wide or larger and the region 130 can be 50 microns or larger.

In some implementations, the region 126 and the region 130 overlap with one another. The region 126 to which the heat source 116 delivers energy includes the region 130, a portion of the build area 122 that the beam spot 139 has traversed, and/or a portion of the build area 122 that the beam spot 139 will traverse. Said another way, the heat source 116 delivers energy to a portion of the build area 122 before the energy source 118 delivers energy to that portion and/or to a portion of the build area 122 after the energy source 118 delivers energy to that portion. For example, the region 126 can lag behind the region 130 by one or more voxels, or by one or more cells 127.

By providing energy to a portion of the topmost layer 104 before the energy source 118 provides energy, the heat source 116 pre-heats the region 126 in preparation for the energy source 118 to melt and sinter the region 130. Pre-heating provides a gradual increase in temperature and brings the feed material to an elevated temperature to reduce the difference between the initial and melting temperatures thereby reducing the energy density required of the energy source 118 to fuse the feed material. Reducing the energy density required of the energy source 118 by fusing feed material at a pre-heated elevated temperature facilitates faster scanning without risk of incomplete fusion. Heating fused portions of the topmost layer 104 using heat source 116 minimizes thermal variation over the topmost layer 104 and successive layers 121 thereby minimizing residual stress as the part increases in height layer by layer.

After the feed material in the region 130 is melted and fused, the heat source 116 can continue to deliver energy to this portion of the feed material to heat-treat the feed material and thereby control the rate of cooling of the feed material. The beam spot 139 is scanned through a portion of the region 130 or through the entirety of the region 130 while the heat source 116 is operated to selectively pre-heat or heat-treat the sections 128 based on traversal of the beam spot 139 through the region 130.

Figure 3:
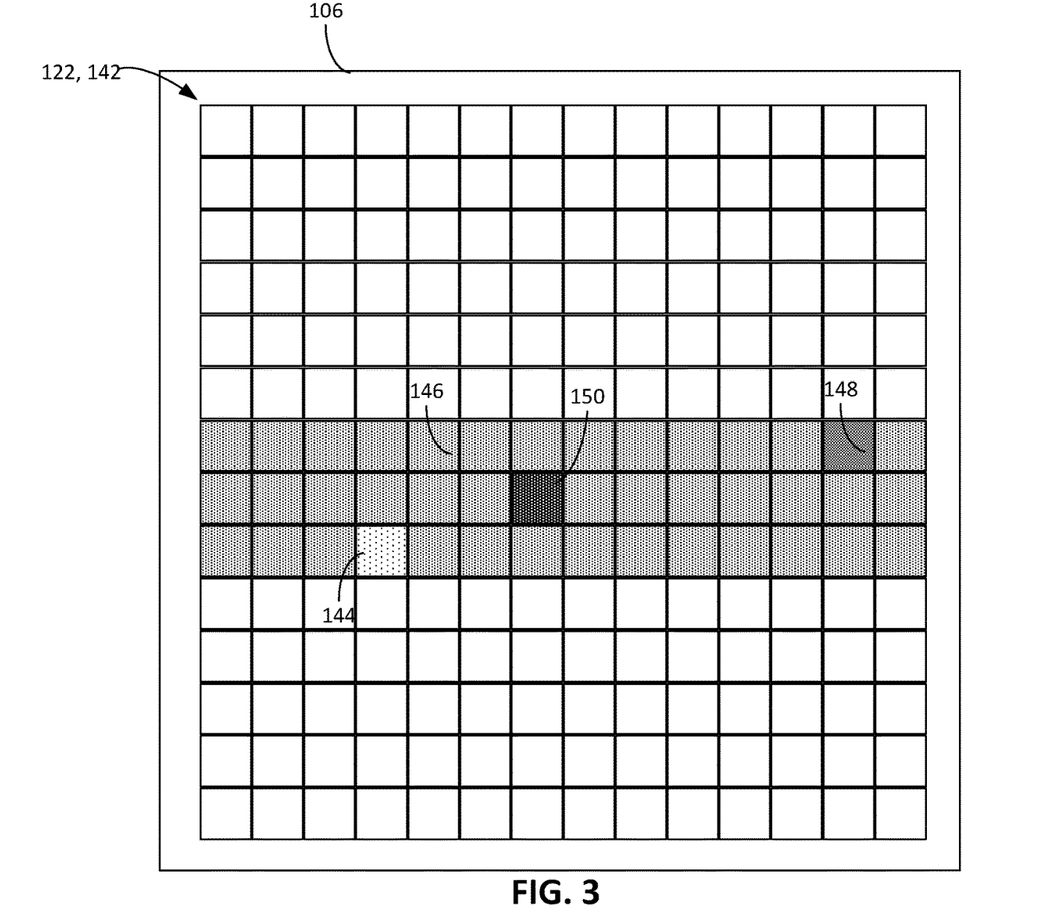
FIG. 3 shows a temperature map generated by a thermal imaging device.

The sensor system 102 monitors the temperature of the feed material while the energy delivery system 114 facilitates fusing of the feed material. The thermal imaging device 108 measures temperatures of the feed material. For example, the thermal imaging device 108 is an infrared image capture system, e.g., an infrared camera, that captures imagery indicative of temperature variation within a region 140 of the build area 122. Referring to FIG. 3, the captured imagery is usable to form a temperature map 142 indicative of temperatures, e.g., average temperatures, throughout the region 140. The thermal imaging device 108 measures temperatures at multiple positions extending across the region 140. In some examples, the positions at which the temperature is measured are uniformly distributed in the region 140.

In some implementations, the region 140 covers an entirety of the build area 122, e.g., across both a length and a width of the build area 122. In other words, the thermal imaging device 108 has a field of view 108a that covers the whole build area 122. The region 140 can cover each of the cells 127 of the build area 122. In some implementations, the region 140 cover less than an entirety of the build area 122, but still covers an area larger than the region 126. In implementations in which the region 140 covers less than the entirety of the build area 122, the thermal imaging device 108 is movable relative to the platform 106 to enable measurements of temperatures across the entirety of the build area 122.

In the example depicted in FIG. 3, the temperature map 142 indicates that a temperature of the feed material in the region 126 is greater than a temperature of the feed material outside of the region 126, e.g., due to delivery of energy by the heat source 116. Within the region 126, the thermal imaging device 108 detects temperature variation. For example, temperature in a first area 144 is less than the temperature in a surrounding area 146, and temperature in a second area 148 is greater than the temperature in the surrounding area 146. In addition, temperature in a third area 150 is greater than the temperature in the surrounding area 146 and greater than the temperature in the second area 148, e.g., due to delivery of energy by the energy source 118.

Referring briefly to FIG. 2, the melt pool monitor 110 generates data indicative of properties of the feed material in a region 152 including the region 130 to which the energy source 118 directs the beam of energy 132. The region 152 overlaps the region 130 and surrounds the region 130. Although the region 152 monitored by the melt pool monitor 110 is larger than the region 130, it is still directed to a region significantly smaller than the region 140. For example, the camera of the melt pool monitor 110 can have a field of view 110a that covers a single voxel, or two or more voxels. In the example shown in FIG. 2, the region 152 covers multiple voxels 129, with a center of the region 152 collocated with a center of the region 130 such that the melt pool monitor 110 can generate data indicative of properties of the feed material being melted by the beam spot 139. The melt pool monitor 110 can cover a single one of the cells 127 or, in some cases, can cover a single cell 127 and a portion of surrounding cells 127. For example, the region 152 covers one or more voxels covered by the region 130 and also covers an area surrounding the region 130. The area surrounding the region 130 can include entire voxels surrounding the region 130. In some cases, the region 130 can include a portion of each voxel surrounding the region 130. In this regard, the melt pool monitor 110 can detect temperatures of the feed material in the region 130 as well as feed material in the area surrounding the region 130. The temperatures of the feed material in the region 130 relative to the temperatures of the feed material in the area surrounding the region 130 can be indicative of the one or more properties described herein as being monitored by the melt pool monitor 110.

The melt pool monitor 110 is movable relative to the platform 106 to follow the region 130. For example, movement of the melt pool monitor 110 relative to the platform 106 tracks the movement of the beam spot 139 on the topmost layer 104.

Figure 4:
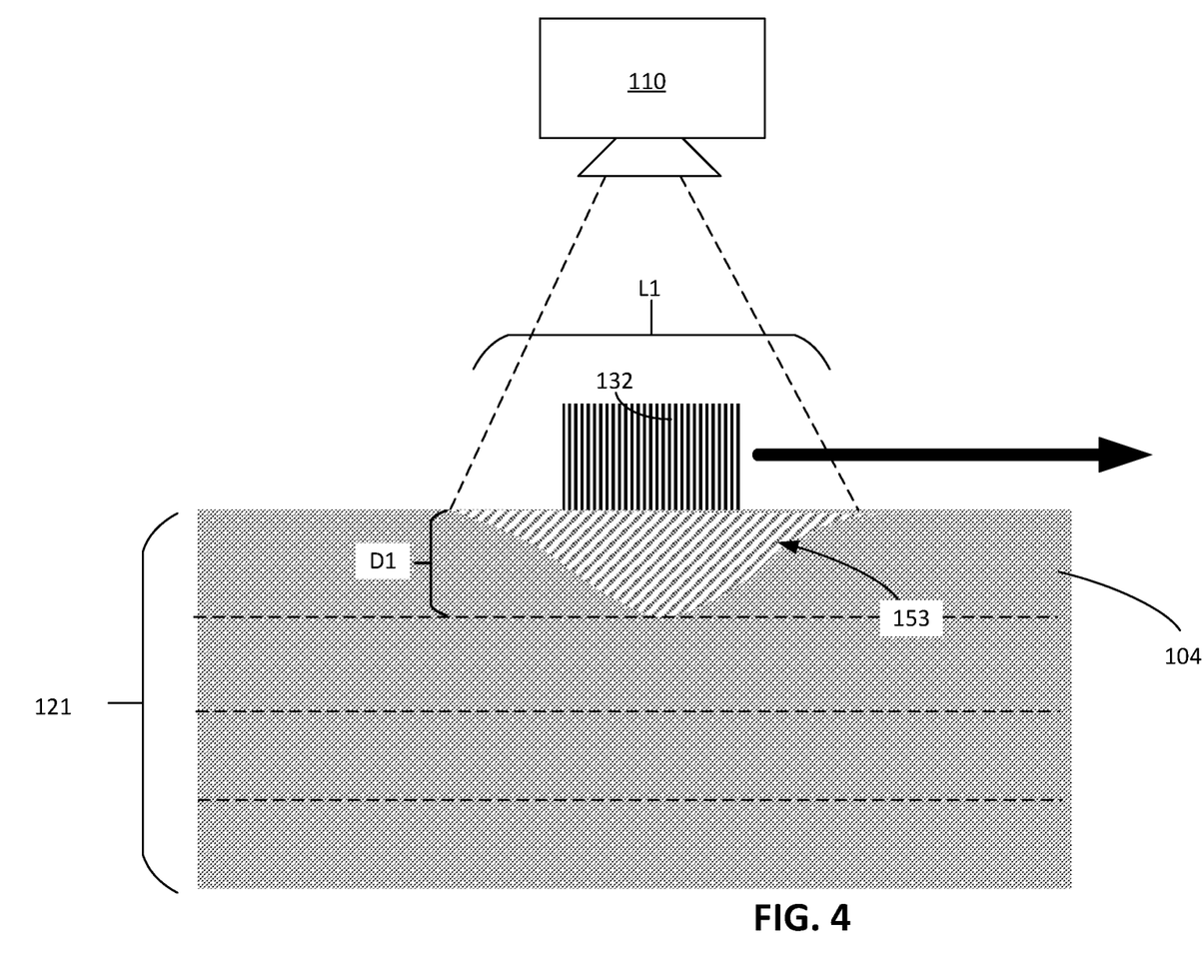
FIG. 4 is a side view of a melt pool.

Referring to FIG. 4, the properties of the feed material measured by the melt pool monitor 110 include properties of a melt pool 153. The melt pool 153 is formed from the feed material due to the energy imparted by the beam of energy 132 impinging the topmost layer 104 of the feed material.

In some examples, the melt pool monitor 110 includes infrared filters, magnification lens, and a high-speed camera that is temperature calibrated to measure temperatures in the region 152. From the imagery captured by the melt pool monitor 110, the controller 119 can distinguish between fused feed material, unfused feed material, and melted feed material. The measurements by the melt pool monitor 110 can also be indicative of other properties of the feed material, such as, a cooling rate of the feed material, a rate of crystallization of the feed material, or other material properties of the feed material. The distribution of temperatures within the region 152 is indicative of whether a portion of feed material is fused, unfused, or melted. For example, to determine which portion of the feed material constitutes the melted feed material, the temperatures measured by the melt pool monitor 110 are compared to a predefined threshold. Portions of the feed material having temperatures above the predefined threshold are melted and thus constitute the melt pool 153.

While the thermal imaging device 108 may provide measurements of the temperatures of melt pool 153, in some implementations, the melt pool monitor 110 provides a more precise measurement of the temperature or a higher resolution image of the feed material in the region 152 than the thermal imaging device 108. In some implementations, the melt pool monitor 110 provides measurements of thermal gradients of the melt pool 153 at a solid-liquid interface between the melt pool 153 and unfused feed material in the topmost layer 104 of feed material. The measurements of the thermal gradients can be indicative of one or more dimensions of the melt pool 153 such that the size and the shape of the melt pool 153 can be precisely controlled. The thermal gradients can be determined based on temperature measurements of both the feed material forming the melt pool 153 as well feed material surrounding the melt pool 153.

Because the region 130 that the beam of energy 132 impinges has a relatively small area compared to the overall area of the region 140, it can be advantageous to have a higher resolution temperature measurement for the region 152 (encompassing at least the region 130) so that the beam of energy 132 can be more precisely controlled. These temperature measurements can be combined with the temperature measurements of the thermal imaging device 108 to provide a temperature map having a higher temperature resolution in the region 152.

In addition to temperature, the properties detected by the melt pool monitor 110 can include one or more properties indicative of a geometry of the melt pool 153, such as for example a dimension of the melt pool 153, a length L1 of the melt pool 153, a width (not shown) of the melt pool 153, a depth D1 of the melt pool 153, a roundness of the melt pool 153, a shape of the melt pool 153, or other property of the melt pool 153 dependent on the characteristics of the energy delivered to the region 130. The dimensions of the melt pool 153 can be calculated by the controller 119 based on image processing algorithms.

Referring back to FIG. 1B, the spectrophotometer 112 measures properties of the feed material in a region 154 of the feed material. The spectrophotometer 112 is an infrared spectrophotometer that emits an infrared light toward a portion of the feed material to detect a spectral response of the portion of the feed material to the emitted infrared light. Measurements taken by the spectrophotometer 112 are indicative of a temperature of the portion of the feed material while the portion of the feed material is cooling from its previous impingement by the beam of the energy 132. As the feed material in the region 154 cools, optical wavelengths detectable by the spectrophotometer 112 vary. The detected wavelengths are indicative of the temperature of the feed material in the region 154.

The region 154 can lag behind the region 130 to which the energy source 118 directs the beam of energy 132. The region 154 can track the cells 127 immediately lagging the region 130. In this regard, the spectrophotometer 112 measures the properties of a portion of the feed material after the energy source 118 has delivered energy to the portion of the feed material. The region 154 can be larger than region 152, but smaller than region 140. For example, if the region 152 covers a single voxel, the region 154 can cover multiple voxels 129. If the region 152 covers a single cell 127, the region 154 can cover multiple cells 127. The portion of the feed material monitored by the spectrophotometer 112 corresponds to a portion of feed material that is immediately behind the melt pool 153 relative to the direction 141 of movement of the beam spot 139 and that has been recently melted by the energy source 118. For example, the region 154 is offset from the region 130 by 1 to 10 voxels. Alternatively, the region 154 includes the region 130 and also includes at least a portion ahead of the region 130 by 1 to 10 voxels and/or a portion behind the region 130 by 1 to 10 voxels. In this regard, a field of view 112a of the spectrophotometer can cover up to 10 voxels, or more.

The spectrophotometer 112 can provide high resolution temperature readings for feed material that is being cooled. These readings can be combined with the measurements of the thermal imaging device 108 and the melt pool monitor 110 to provide a temperature map having improved precision in the region 154, particularly for temperatures of the feed material during gradual heating and cooling.

In some implementations, the region 154 further includes a portion of the feed material immediately ahead of the melt pool 153 relative to the direction 141 of movement of the beam spot 139. In such cases, the spectrophotometer 112 provides measurements of portions of the feed material that are to be gradually heated for melting and fusing.

Figure 5:
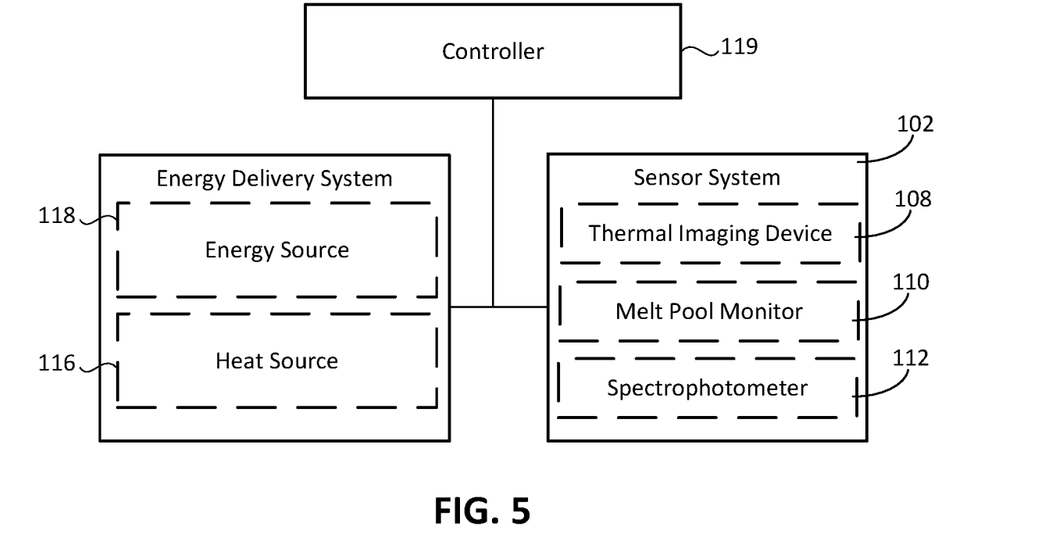
FIG. 5 is a block diagram of an additive manufacturing apparatus.

Referring to FIG. 5, the controller 119 is operably connected to the energy delivery system 114 including the heat source 116 and the energy source 118, thereby enabling the controller 119 to control the operations of the energy delivery system 114. The controller 119 is further operably connected to the sensor system 102 such that the controller 119 can use data gathered by the sensor system 102 to control the operations of the heat source 116 and the energy source 118. Based on data gathered by the sensor system 102, the controller 119 operates the energy delivery system 114 to achieve improved fusing quality. In particular, as described herein certain parameters of the heat source 116 and certain parameters of the energy source 118 are adjustable in response to signals from the sensor system 102.

The controller 119 receives data from each of the thermal imaging device 108, the melt pool monitor 110, and the spectrophotometer 112, and combines the data to generate a temperature profile of the topmost layer 104. For example, the thermal imaging device 108 provides to the controller 119 data indicative of temperatures across a portion of or an entirety of the topmost layer 104 of feed material. The melt pool monitor 110 provides to the controller 119 data indicative of a temperature of the melt pool 153 and data indicative of a geometry of the melt pool 153. The spectrophotometer 112 provides to the controller 119 data indicative of a temperature of a portion of the feed material previously impinged or to be impinged by the beam of energy 132. Based on these data provided by the thermal imaging device 108, the melt pool monitor 110, the spectrophotometer 112, and the controller 119 can generate an accurate temperature profile, e.g., a temperature map, of the topmost layer 104 of feed material.

In some implementations, to improve the accuracy and the precision of the temperature profile of the topmost layer 104, the controller 119 generates the temperature profile based on temperature profiles of layers of feed material under the topmost layer 104. In particular, the controller 119 generates temperature profiles of each of the underlying layers of feed material using data generated by the thermal imaging device 108, the melt pool monitor 110, and the spectrophotometer 112 when the energy delivery system 114 is delivering energy to a corresponding underlying layer. The temperature data for the underlying layers correspond to historical data usable for generating the temperature profile for the topmost layer 104. In some implementations, the temperatures in the historical data are adjusted to account for heat flow through the underlying layers over time. The controller 119 is thus provided with a layer-by-layer temperature profile. The controller 119 computes an amount of heat transfer from the underlying layers to the topmost layer 104 and generates the temperature profile of the topmost layer 104 accounting for the computed amount of heat transfer. The controller 119 thus generates the temperature profile based on the temperature profiles of the underlying layers.

In addition to being provided with temperature data for generating a current temperature profile, the controller 119 receives information indicative of a desired temperature profile of the topmost layer 104. In some implementations, the desired temperature profile corresponds to a controller-selected desired temperature profile for the topmost layer 104. For example, the controller 119 receives data indicative of an object to be formed and then selects a desired temperature profile based on the object and based on desired changes in morphology and properties of the feed material. For example, the temperatures in the desired temperature profile are each selected to achieve desired pre-heating, heat-treating, or melting of the feed material. As described herein, the energy delivery system 114 is operated in a closed feedback loop to deliver energy to the topmost layer 104 to achieve the desired temperature profile based on the temperature profile measured using the sensor system 102.

The desired temperature profile is indicative of temperatures that vary spatially along the topmost layer 104 at any given time so that energy delivered to the topmost layer 104 to achieve the desired temperature profile facilitates formation of the object. For example, the region 130 to be impinged by the beam of energy 132 has the highest temperature in the desired temperature profile. The area immediately ahead of the region 130 relative to the direction 141 of movement of the beam spot 139 has a greater temperature than surrounding areas so that the feed material in this area is gradually heated in preparation for being sintered and fused by the beam of energy 132. Similarly, the area immediately behind the region 130 relative to the direction 141 of movement of the beam spot 139 has a greater temperature than surrounding areas as feed material in the area is cooling from recent impingement by the beam of energy 132.

In addition, the controller 119 adjusts the amount of heat delivered by the energy delivery system 114 as the additive manufacturing process progresses such that individual voxels follow the desired temperature profile. For example, the controller 119 can compensate for any detected non-uniformity of the initial temperature, e.g., by increasing or decreasing the heat delivered by the heat source 116.

The heat source 116 and the energy source 118 have parameters that are adjustable to facilitate achieving the desired temperature profile. In implementations in which the heat source 116 includes multiple infrared lamps, the adjustable parameters of the heat source 116 include a parameter indicative of intensities of the lamps. The intensities of the lamps can be set to different values to achieve the desired temperature profile. For example, if a temperature of the measured temperature profile at a location is less than a desired temperature of the desired temperature profile at a location along the build area 122, a power of an infrared lamp directly above the location is increased to increase the measured temperature. Similarly, if a temperature of the measured temperature profile at a location is greater than a desired temperature at the location, the power is decreased to decrease the measured temperature.

In the example temperature map 142 depicted in FIG. 3, the heat source 116 is operated such that the lamp overlying the first area 144 is activated or is modulated to emit energy at a greater rate, e.g., with greater intensity, so that the temperature of the first area 144 can be increased relative to the surrounding area 146. In addition, the heat source 116 is operated such that the lamp overlying the second area 148 is deactivated or is modulated to emit energy at a lower rate, e.g., with less intensity, so that the temperature of the second area 148 can be decreased relative to the surrounding area 146. The surrounding area 146 have temperatures that matches the desired temperatures in the desired temperature profile. In this regard, the lamps overlying the surrounding area 146 are maintained at the set intensities.

In some examples, the lamps of the heat source 116 are operated to control temperatures at locations immediately ahead of or immediately behind the region 130 in accordance to the desired temperature profile. The lamps positioned above the locations immediately ahead of the region 130 are operated to allow for gradual cooling of the locations immediately behind the region 130 and gradual heating of the locations ahead of the region 130.

Adjustable parameters of the energy source 118 include a size of the beam spot 139, a scanning speed of the beam spot 139, a power of the beam of energy 132, or a hatch spacing of the scan pattern for the beam of energy 132. For example, in implementations in which the temperature in the region 130 is less than a desired temperature of the desired temperature profile in the region 130, the size of the beam spot 139 is decreased, the scanning speed of the beam spot 139 is decreased, or the power of the beam of energy 132 is increased to increase the temperature in the region 130. This increases the power density in the region 130, thereby increasing the rate of energy delivery to the region 130. In implementations in which the temperature in the region 130 is greater than the desired temperature in the region, the size of the beam spot 139 is increased, the scanning speed of the beam spot 139 is increased, or the power of the beam of energy 132 is decreased to decrease the temperature in the region 130. This decreases the power density in the region 130, thereby decreasing the rate of energy delivery to the region 130.

In some implementations, a temperature at a location outside of the region 130 is greater than or less than a desired temperature at the location. Because the beam spot 139 can generate temperature increases at locations outside of the region 130, a scan pattern of the beam of energy 132 is adjustable to influence the temperature of portions of the topmost layer 104 outside of the region 130. For example, a hatch spacing of the scan pattern, e.g., a distance between parallel paths of the scan pattern, can be increased in response to the temperature at the location outside of the region 130 being above the desired temperature. This increase in the hatch spacing reduces the rate of heat transfer from the region 130 to the location. Similarly, the hatch spacing can be decreased in response to the temperature at the location outside of the region 130 being below the desired temperature. This decrease in the hatch spacing increases the rate of heat transfer from the region 130 the location.

A number of implementations have been described. Nevertheless, it will be understood that various modifications may be made.

Controllers and computing devices can implement these operations and other processes and operations described herein. As described above, the controller 119 of the apparatus 100 can include one or more processing devices connected to the various components, systems, and subsystems of the apparatus 100. The controller 119 can coordinate the operation and cause the apparatus 100 to carry out the various functional operations or sequence of steps described above.

The controller 119 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 119 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 119, e.g., as controlled by firmware or software, can interpret the data object received from the computer to generate the set of signals necessary to control the components of the apparatus 100 to fuse the specified pattern for each layer.

While some specific implementations have been described, other implementations are possible. For example:

While the energy source 118 is described as providing energy to sinter or melt the feed material, in some implementations, an energy source is operable to pre-heat or heat-treat a portion of the feed material. For example, the energy source 118 is configured such that the power of the beam of energy 132 emitted by the energy source 118 can be modulated. The power is selected such that the beam of energy 132 impinges the region 130 to pre-heat or heat-treat the feed material in the region 130.

Alternatively or additionally, the apparatus 100 includes one or more additional energy sources operable to pre-heat or heat-treat the feed material. For example, an energy source is operable to emit a beam of energy that lags behind the beam of energy 132 emitted by the energy source 118. This additional beam of energy is used to heat-treat the feed material, e.g., based on the desired temperature profile. Alternatively or additionally, an energy source is operable to emit a beam of energy that leads the beam of energy 132 emitted by the energy source 118. This additional beam of energy is used to pre-heat the feed material, e.g., based on the desired temperature profile. While the energy source 118 is described as including a laser, in some implementations, the energy source 118 includes an electron beam for pre-heating or heat-treating the feed material.

In some implementations, the heat source 116 includes a laser and a galvo mirror scanner and a planar mirror. Alternatively or additionally, the heat source 116 includes a laser and polygon mirror scanner. The polygon mirror scanner receives a beam of light and continuously rotates in a single direction to cause the beam of light to be scanned along a path.

While the heat source 116, the energy source 118, the thermal imaging device 108, the melt pool monitor 110, the spectrophotometer 112, or combinations thereof are described as being movable relative to the platform 106, in some implementations, the platform 106 is movable relative to these devices. For example, the platform 106 is mounted on a conveyor that is operated to translate the platform 106 along the Y-axis, the X-axis, or both.

While the thermal imaging device 108, melt pool monitor 110, and spectrophotometer 112 are described as being movable relative to the platform 106, in some implementations the thermal imaging device 108, melt pool monitor 110, and spectrophotometer are integrated within the optical engine between the laser 134 and mirror 136. For example, optical beam splitters are placed between the laser 134 and mirror 136 to form on-axis optical paths from sensors in the optical engine, along the laser beam 132, and toward different portions of the topmost layer 104.

Accordingly, other implementations are within the scope of the claims.

What is claimed is:

1. An additive manufacturing apparatus, comprising:
   a platform;
   a dispenser to dispense successive layers of feed material on the platform;
   a heat source above the platform, the heat source configured to deliver energy to a first region of a topmost layer of the successive layers of feed material to pre-heat and/or heat-treat the first region;
   an energy source to emit a beam of energy to impinge a second region of the topmost layer, the second region smaller than the first region;
   a sensor system to measure temperatures of the topmost layer of feed material in at least a region outside a melt pool and to measure a dimension of the melt pool; and
   a controller configured to
      operate the heat source to heat the topmost layer of feed material based on the measured temperatures, and
      operate the energy source to cause the beam to fuse feed material in the topmost layer by generating the melt pool from feed material in the second region and positioning the beam to impinge the topmost layer in a first area having a generally planar top surface such that the melt pool extends into the topmost layer and has an upper surface coplanar with a surrounding second area of the top surface of the topmost layer with beam intensity based on the measured dimension and the measured temperatures of the region outside the melt pool.

2. The apparatus of claim 1, wherein:
   the heat source comprises an array of lamps to deliver energy to the first region, and
   the controller is configured to selectively operate each lamp of the array of lamps based on the measured temperatures.

3. The apparatus of claim 1, wherein the energy source comprises a laser.

4. The apparatus of claim 1, wherein the controller is configured to operate the energy source such that a size of the second region, a power of the beam of energy, or a scan speed is adjusted based on the measured dimension.

5. The apparatus of claim 1, wherein the sensor system comprises an infrared image capture system configured to measure the temperatures across an entire width and an entire length of the topmost layer of feed material.

6. The apparatus of claim 1, wherein the sensor system comprises an infrared image capture system configured to measure the temperature at multiple locations uniformly distributed through an entire length and an entire width of the topmost layer of feed material based on thermal emissions from the topmost layer of feed material.

7. The apparatus of claim 1, further comprising a high-speed camera configured to measure the dimension of the melt pool and a thermal gradients at a solid-liquid interface.

8. The apparatus of claim 7, wherein the high-speed camera is configured to measure temperatures of feed material in the melt pool, and the controller is configured to determine the dimension of the melt pool based on the measured temperatures of feed material relative to a threshold temperature.

9. The apparatus of claim 7, wherein the high-speed camera is configured to measure a length and to measure a width of the melt pool, and the controller is configured to operate the energy source based on the measured length and the measured width.

10. The apparatus of claim 1, wherein the sensor system comprises a spectrophotometer to detect wavelengths emitted by feed material in a third region of the topmost layer, and the controller is configured to determine cooling rates of feed material in the third region based on the detected wavelengths and operate the heat source or the energy source based on the determined cooling rates.

11. The apparatus of claim 10, wherein the third region is smaller than the first region and larger than the second region.

12. An additive manufacturing method comprising:
dispensing successive layers of feed material on a platform;
measuring temperatures of a topmost layer of feed material of the successive layers of feed material;
delivering heat to a first region covering the topmost layer based on the measured temperatures; and
emitting a beam of energy to a second region smaller than the first region based to fuse the feed material by generating a melt pool that extends into the topmost layer and has an upper surface coplanar with a surrounding area of a top surface of the topmost layer, wherein an intensity of the beam is based on a dimension of a melt pool of the feed material created by the beam of energy and based on temperatures of the topmost layer of feed material in at least a region outside the melt pool.

13. The method of claim 12, wherein delivering the heat to the first region comprises selectively operating each lamp of an array of infrared lamps based on the measured temperatures.

14. The method of claim 12, wherein the beam of energy is emitted by a laser.

15. The method of claim 12, wherein a size of the second region, a power of the beam of energy, or a scan speed is selected based on the dimension of the melt pool.

16. The method of claim 12, wherein measuring the temperatures of the topmost layer of feed material comprises measuring a temperature at multiple locations uniformly distributed through an entire length and an entire width of the topmost layer of feed material based on thermal emissions from the topmost layer of feed material.

17. The method of claim 12, further comprising measuring, using a high-speed camera, the dimension of the melt pool.

18. The method of claim 17, wherein measuring the dimension of the melt pool comprises
measuring temperatures of feed material in the melt pool, and
determining the dimension of the melt pool based on the measured temperatures of feed material relative to a threshold temperature.

19. The method of claim 17, wherein the dimension is a length, and the method further comprises measuring, using the high-speed camera, a width of the melt pool,
wherein emitting the beam of energy comprises emitting the beam of energy based on the measured length and the measured width.

20. The method of claim 12, wherein measuring the temperatures comprises
detecting wavelengths emitted by feed material in a third region of the topmost layer, and
determining cooling rates of feed material in the third region based on the detected wavelengths.

21. The method of claim 20, wherein the third region is smaller than the first region and larger than the second region.

22. An additive manufacturing apparatus, comprising:
a platform;
a dispenser to dispense successive layers of feed material on the platform;
a heat source above the platform, the heat source configured to deliver energy to a first region of a topmost layer of the successive layers of feed material to pre-heat and/or heat treat the first region;
an energy source to emit a beam of energy to impinge a second region of the topmost layer to generate a melt pool from feed material in the second region, the second region smaller than the first region;
a sensor system including
a first camera having a stationary first field of view of a build region of the platform,
a second camera having a second field of view that is smaller than the first field of view and that is configured to trail the second region, and
a third camera having a third field of view that is smaller than the second field of view and that covers the second region; and
a controller configured to
receive data from the first camera, the second camera and the third camera and generate a temperature map of the layer of feed material from the data, and
operate the energy source to fuse feed material in the topmost layer based on the temperature map.

* * * * *